United States Patent
Shim et al.

(10) Patent No.: US 7,577,239 B1
(45) Date of Patent: Aug. 18, 2009

(54) TRACKING AND CONTROLLING THE IMPACT OF UNWANTED MESSAGES

(75) Inventors: Choon B. Shim, Ijamsville, MD (US); Dongwook Shin, Potomac, MD (US)

(73) Assignee: Cisco Technology, Inc., San Jose, CA (US)

( * ) Notice: Subject to any disclaimer, the term of this patent is extended or adjusted under 35 U.S.C. 154(b) by 811 days.

(21) Appl. No.: 11/125,323

(22) Filed: May 10, 2005

Related U.S. Application Data

(60) Provisional application No. 60/569,239, filed on May 10, 2004.

(51) Int. Cl.
*H04M 1/64* (2006.01)

(52) U.S. Cl. ............ 379/88.22; 379/93.23; 379/114.04; 379/121.01; 379/142.04; 379/211.02; 455/415; 455/528; 709/207; 726/14

(58) Field of Classification Search ............... 379/88.22, 379/93.23, 142.04, 142.05, 114.22, 121.01, 379/211.02; 709/207; 726/14; 455/415, 455/528

See application file for complete search history.

(56) References Cited

U.S. PATENT DOCUMENTS

| | | | | |
|---|---|---|---|---|
| 6,028,922 A * | 2/2000 | Deutsch et al. | ........ | 379/211.02 |
| 6,198,812 B1 * | 3/2001 | Weber | ............... | 379/142.04 |
| 6,259,779 B1 * | 7/2001 | Council et al. | ......... | 379/121.01 |
| 6,353,663 B1 * | 3/2002 | Stevens et al. | ......... | 379/114.22 |
| 6,535,592 B1 * | 3/2003 | Snelgrove | ............. | 379/114.07 |
| 6,650,742 B1 * | 11/2003 | Elliott et al. | ........... | 379/114.22 |
| 6,968,046 B2 * | 11/2005 | Mizuno | ................. | 379/93.23 |
| 7,116,769 B2 * | 10/2006 | Hama | .................... | 379/142.05 |
| 7,130,390 B2 * | 10/2006 | Abburi | .................... | 379/88.17 |
| 7,409,206 B2 * | 8/2008 | Bronstein | ................. | 455/415 |
| 2002/0128033 A1 * | 9/2002 | Burgess | .................. | 455/528 |
| 2005/0021649 A1 * | 1/2005 | Goodman et al. | ........... | 709/207 |
| 2006/0235934 A1 * | 10/2006 | Wilson et al. | ............... | 709/207 |
| 2006/0282888 A1 * | 12/2006 | Bandini et al. | ................ | 726/14 |

* cited by examiner

*Primary Examiner*—Gerald Gauthier
(74) *Attorney, Agent, or Firm*—Schwegman, Lundberg & Woessner, P.A.

(57) ABSTRACT

A system and method track short term and long term intervals to assess whether a voice message source is a likely source of voice spam. Upon detection of a spamming threshold, calls from the source are blocked until detection that a sufficient time interval has elapsed without generation of messages.

18 Claims, 6 Drawing Sheets

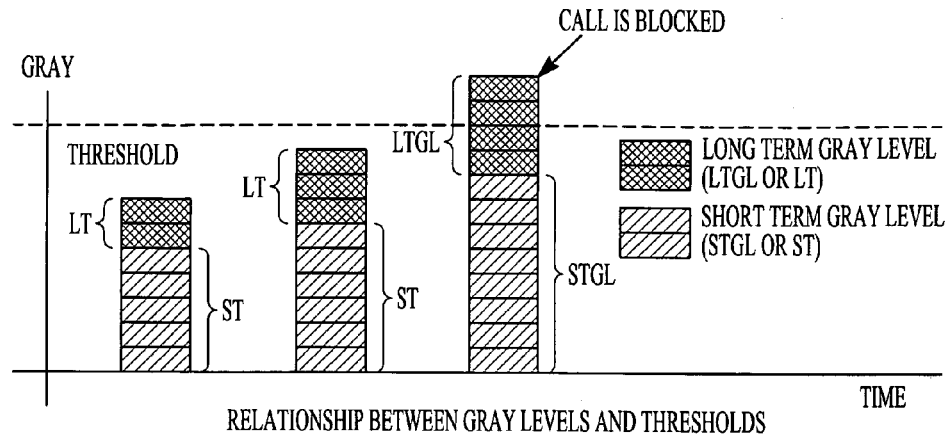
FIG. 3 — RELATIONSHIP BETWEEN GRAY LEVELS AND THRESHOLDS
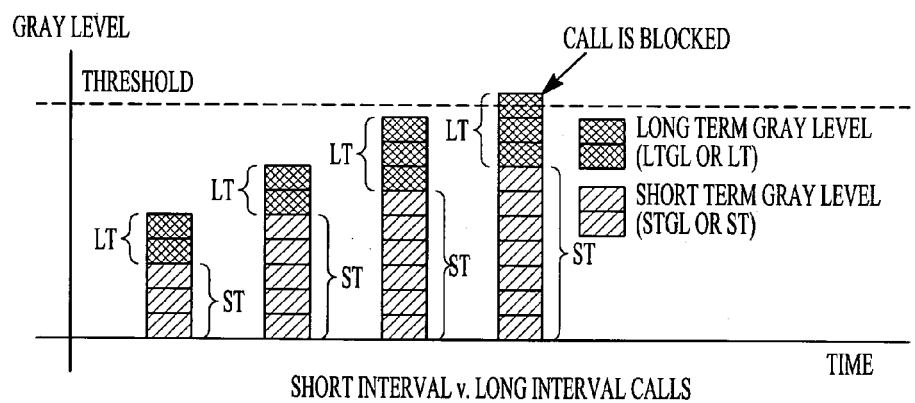
FIG. 4A — SHORT INTERVAL v. LONG INTERVAL CALLS
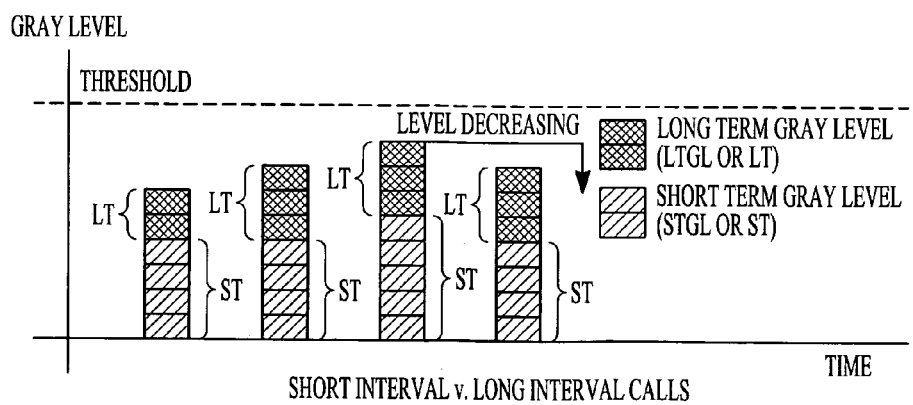
FIG. 4B — SHORT INTERVAL v. LONG INTERVAL CALLS

TRACKING AND CONTROLLING THE IMPACT OF UNWANTED MESSAGES

This application claims priority under 35 U.S.C. §119(e) to U.S. Provisional Application No. 60/569,239, filed May 10, 2004, the entire content of which is hereby incorporated by reference.

BACKGROUND

The present invention is directed to a method and a system for reducing the affects of a proliferation of unwanted messages. More specifically the present invention is directed to a method and a system for reducing the affects of spam messaging attempts in a voice over IP environment.

Voice over IP (VoIP) is a technology that allows for telephone-like communications over non-traditional telephony networks. Specifically, VoIP allows users to create data packets for transmission over the Internet Protocol (IP) "network" when those packets contain voice information for a telephone call. VoIP is gaining popularity.

Spam. That annoying four-letter word of which everyone hates to be the recipient. Not only is spam annoying, but it also invades our privacy. Spam congests our electronic mail (email) boxes rather quickly as it eats up precious bandwidth. It is easy to imagine that Internet hacking and other security problems we currently face with email spam will create analogous problems in the VoIP environment, particularly as it becomes more popular. Fortunately, the current options to create VoIP spam have a much higher bandwidth and resource expense ratio than occurs with the creation of email spam. This acts as an impediment to VoIP spam today. But there is little doubt that voice spam is lurking out there to pounce on the vulnerable. In contrast to email protocols represented by SMTP, VoIP as presently configured does not tolerate any negotiation in its signaling steps nor its screening content. Thus, it is difficult to implement voice spam protection or control algorithms that are simply analogs to the e-mail spam control techniques.

Within an email setting, administrators and users have the ability to quarantine incoming email to check for spam and/or viruses. Using Simple Mail Transfer Protocol (SMTP), administrators can tap into its negotiation signals to check the content of incoming emails and filter out those that contain suspicious content. In contrast to email protocols represented by SMTP, VoIP unfortunately does not tolerate any negotiation in its signaling steps nor its screening content. Thus, VoIP networks create a difficult task for administrators to implement spam protection or control algorithms.

Thus it is desirable to provide an arrangement that can effectively deal with attempts to burden VoIP arrangements with VoIP spam.

SUMMARY OF THE INVENTION

The present invention provides a method and system for reducing the impact of VoIP spam. In accordance with one embodiment the invention provides an arrangement that monitors messages, tracking source information and tabulating short term and long term message totals from a given source. By varying parameters such as the time intervals and the number of allowable messages per time interval the arrangement can create a filtering process that prevents receipt and storage of VoIP messages from a given source so long as they are identified as having the message transmission characteristics of an undesirable source or "spammer."

In one embodiment a voice spam control algorithm progressively calculates the 'gray level' of a caller (the level that establishes if the caller is likely a spam source or not) in multi-term levels, and determines whether the call will be connected based upon previous call patterns.

BRIEF DESCRIPTION OF THE DRAWINGS

The present invention is described with reference to the accompanying drawings. In the drawings, like reference numbers indicate identical or functionally similar elements.

FIG. 3 is a plot that shows a relationship between parameters in one embodiment of the present invention.

FIGS. 4A and 4B are additional plots related to parameters in an embodiment of the present invention.

DETAILED DESCRIPTION

Figure 1:
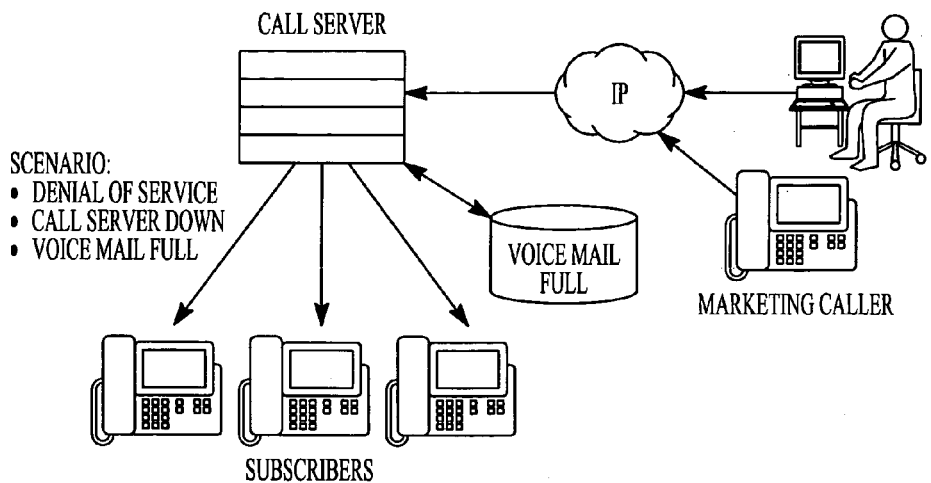
FIG. 1 is a schematic diagram of a configuration in which VoIP spam can occur.

Voice spam is similar to email spam in that senders use an IP network to target a specific user, or group of users, to generate an abundance of calls for marketing purposes or for disrupting users' normal activities. But voice spam is quite different in several aspects from email spam, and the implication may be more dangerous to a VoIP environment than email spam is to the Internet. Table 1 provides a comparison of some of the salient characteristics of e-mail spam and voice spam.

TABLE 1

Email Spam v. Voice Spam

|  | Email Spam | Voice Spam |
| --- | --- | --- |
| Protocol | SMTP/POP3/Outlook | SIP/Skinny/RTP |
| Session | Asynchronous | Synchronous |
| Source of Spam | SMTP Clients | Soft Phones |
| Danger | Annoying/Email Folder Full | Annoying/Call Server Outage/ Voice Mailbox Full |
| Deleting | Multiple Delete | One-by-One Delete |

Voice spam can be more malicious than email spam, and thus a major source of trouble. Email spam is able to disrupt Application Service Providers (ASPs) and fill email folders, compelling recipients to sieve through them. Likewise, voice spam will be able to produce outage of a call server and will overflow voice mail boxes, obligating recipients to filter through them. Fortunately, sorting email spam is now a fairly simple task in that it can be sorted out by subject, for example, and multiple emails can be deleted at once. However with voice spam, typically a receiver has to listen to each voice mail and delete them one by one.

In the spam protection aspect, voice is more difficult to protect than email, owing to its nature of synchronicity. Since email is delivered asynchronously, users and administrators have a lot of chances to check and quarantine them. One of the well known email spam protection algorithms, Bayesian Spam Filtering, is able to analyze the content of emails and detect the spam emails at a certain checkpoint. And seeing that email is delivered asynchronously, it doesn't really matter if email delivery is delayed for a short period of time. However, in the case of voice spam, the decision whether incoming call is spam or not must be made within the connection time. Once the connection is set up, it is too late to take action because the voice spam is already disrupting the call server and recording voice mails.

In the present invention a method and a system monitor call patterns from each caller and determine, based on those patterns; whether a given caller should be considered a voice spam source. When a caller is deemed to be such a source, the system will not connect calls from that caller to avoid overburdening of servers and the message storage system.

The concepts of blacklisting a message source and white listing a message source are known in the art. Blacklisting denies all mail from a given source and whitelisting accepts all mail from a given source, graylisting determines the legitimacy of a sender depending on the current situation.

In addition to these approaches, the notion of gray-leveling for spam control stems from an email spam protection algorithm by Evan Harris called 'graylisting' described in "The Next Step in the Spam Control War: Graylisting".

In accordance with the present invention, a control method uses a new gray level technique adapted to control voice spam. Progressive Multi Gray-Leveling (PMG) monitors call patterns from each caller and determines voice spam based upon these patterns.

The essence of the algorithm is such that as a caller attempts to make numerous calls through the call server in a certain time span, their gray level will increase, thus designating the caller as a likely a spam source. Once the gray level becomes higher than a given spam source threshold, the caller will not be able to make any more calls. However, the gray list differs from a black list in that the caller will not permanently stay in "spammer status." If the designated spam caller behaves well and stops initiating voice spam in specified time period, the gray value will decrease and eventually remove the caller off the black list.

PMG splits the call patterns into two levels, one associated with short term behavior and one associated with long term behavior. The technique references, and processes, these two levels whenever an incoming call is received. PMG determines whether the call is voice spam depending on if the summation of the parameters associated with these two levels exceed the given spam source threshold. If the summation is less than the threshold, the caller is considered a regular user and his/her call is connected. If the summation is greater than the threshold, the caller is regarded as a spam generator and is therefore blocked.

In this process, a short term level can be detected over a short period of time (e.g., one minute). The process detects the number of calls to the server from a source over this short time span. It is recognized that even during such a short period of time a voice spam source is able to generate many calls to attack a server. The short term level increases very quickly when such an attack is underway. This will protect the server from those intensive calls received in a short period of time. The short term level can be selected to decrease as quickly when the caller stops sending calls. The rate of decrease can be selected at system deployment so, for example, if the caller does not make a call in a couple of hours, the short term level decreases and could even return back to zero.

If a system only relied upon a short term level, a spammer would be able to send spam calls again after a relatively short period of time.

The present invention compensates for this potential drawback of the short term level issue, by using a long term level that considers call patterns in a rather long period of time (e.g., one hour). The long term level increases slower than the short term level, as well as decreases at a slower pace. Therefore, the long term value persists longer than the short term level. A rate of increase for the long term level can be adjusted to take into account historical information. For example, it can take into account the history of a caller that has been detected as a spam generator. If a caller has ever been detected as a spam source, the long term value is multiplied by the number of times that it was detected as spam and increases much faster than other regular users. Hence, the spam generator is able to make only a fraction of calls that it originally produced in its previous trial.

Figure 2:
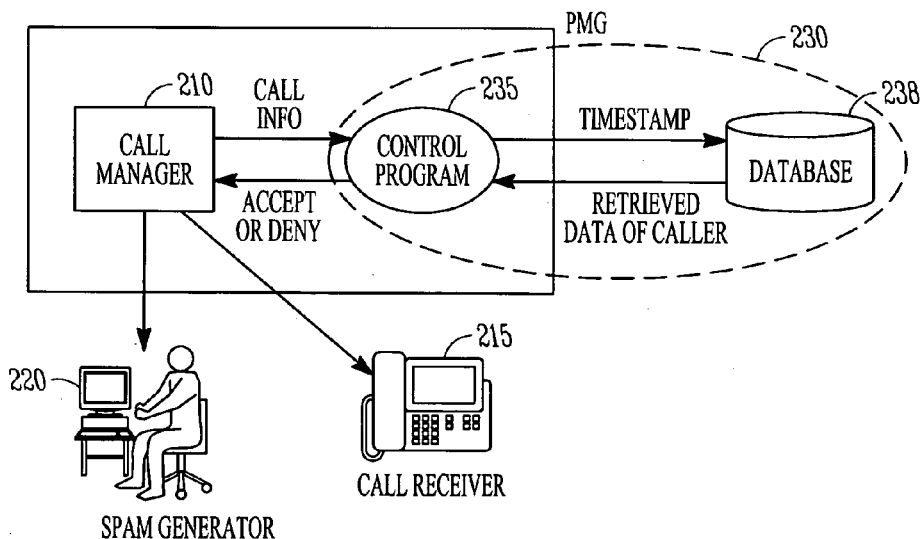
FIG. 2 is a schematic diagram of an embodiment of the invention.

FIG. 2 illustrates a schematic diagram of an embodiment for executing this spam detection and prevention operation. In this illustration a Call Manager 210 processes calls for call receiver 215. As a call comes in from Spam Generator 220 the CallManager queries the PMG 230, specifically Control Program 235 for information about the caller. The present call is time stamped and the database 238 is queried for caller information. The Control Program executes a spam detection algorithm and determines whether to accept or deny the call. This control information is passed to the Control Manager for execution.

FIG. 3 is a graph that illustrates, in general terms, a relationship between short term gray levels (STGLs), long term gray levels (LTGLs), and a spam source threshold. As can be seen, with every call the STGL and LTGL are summed. If the sum is less than the spam source threshold the call is connected. If the sum exceeds the threshold then the call is blocked. The STGL and LTGL will change over time depending upon the number of call requests that are received over the designated interval lengths.

FIG. 4A illustrates a case where a caller generates calls in "short" intervals whereas FIG. 4B illustrates the results when calls are made over "long" intervals. As is seen in the short interval case, both short term gray level and long term gray level are increasing quickly leading to the prompt blocking of the series of calls incoming over a short interval. On the other hand, the long interval case shows when intervals between calls are long, short term level does not increase quickly and will even decrease if the interval is longer than the given time span (i.e., 10 minutes). The resulting summation of the two levels do not increase very fast and therefore allows a larger amount of calls to connect.

An Exemplary Algorithm

In this section an example algorithm is described in detail. One skilled in the art would understand that the parameters selected for inclusion and the parameter values described could be varied depending on the server and/or network configuration resources and/or needs. The gray level of a caller is an important element that must be determined when deciphering voice spam. In the example algorithm two parameters are used to calculate the whole gray level of a caller: one for Short Term Gray Level (STGL) and one for Long Term Gray Level (LTGL). The decision whether to connect a call can be decided by calculating the two levels and measuring their summation. If the summation falls below the threshold (T), the connection is made; otherwise, the connection is blocked.

Figure 5:
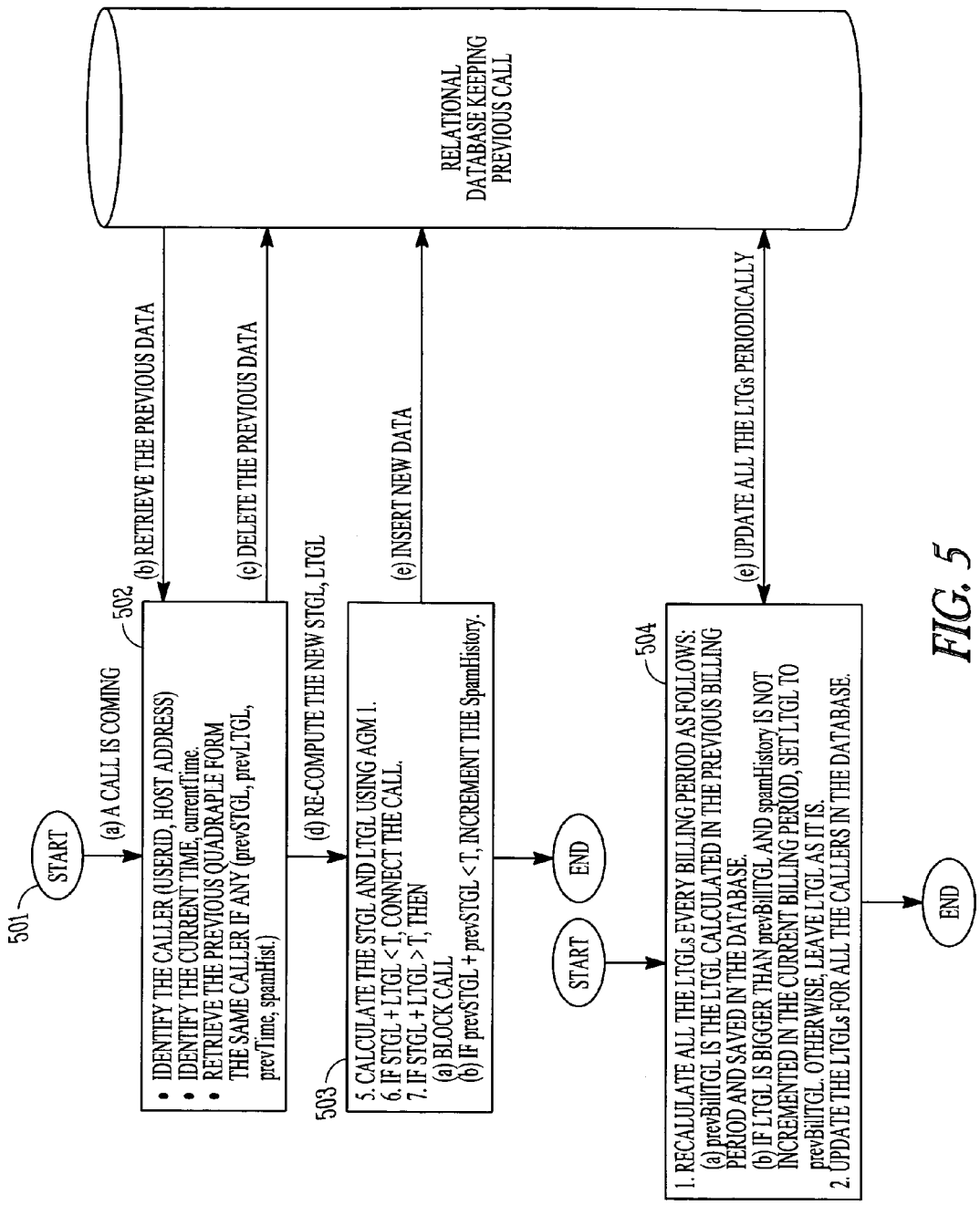
FIG. 5 illustrates a flow diagram for an embodiment of the present invention.

FIG. 5 illustrates a flow diagram associated with the representative algorithm. In a first step the system is initialized, 501.

If a call is received the system identifies the caller and the time of call and associates that information with the call. Using the caller identification information, data is retrieved from a relational database that stores information about previous calls. In this example the retrieved information is in the form of a quadraple including the previous STGL, the previous LTGL, prevTime (i.e. time of prior call(s)) and spamHistory for the caller. After retrieving this information this previous quadraple is deleted from the database. In the disclosed embodiment, this is illustrated as element 502. While in this example four operations are performed the process can be modified to perform the operations individually in different combinations.

Using the data about the current call and the retrieved information, the process computes new values for STGL and LTGL. One example of a process that can be used for this computation is as follows.

---

Agm 1:
1. (a) If time-lap2 − timeGap > 0, LTGL = prevLTGL + C2*(spamHistory+1) * (time-lap2 − timeGap)/(time-lap2)
   (b) If time-lap2 − timeGap <= 0, LTGL = prevLTGL + C2* spamHistory/(spamHistory+1)) * (time-lap2 − timeGap)/ (time-lap2).
   (c) If LTGL < 0, then set LTGL to 0
2. (a) If LTGL < T, STGL = prevSTGL + C1*(time-lap1 − timeGap)/ min(max(timeGap,1), time-lap1).  Relational Database—
   (b) If STGL < 0, then set STGL to 0.  keeping previous call
   (c) If STGL >= T, let LTGL = STGL  information
       and STGL = 0;
Where
* time-lap1 is a short term time period (for instance, 1 min)
* time-lap2 is a long term time period (for instance, 1 hour). But as time-lap2 is a lot longer than time-lap1, LTGL increases in a much slow pace than STGL increases.
* timeGap is the interval between the last call and the current call coming from the same caller
* spamHistory is the recorded history of a caller that has been recognized as spam voice attacks. As a caller is increasingly detected as spam trials, he has more weight on LTGL creating a longer period for the LTGL to decrease. So as a previously identified spam caller tries another spam voice attack, he is more likely to be detected earlier than previous attacks and eventually considered as blacklist.
* prevSTGL and prevLTGL are the STGL and LTGL value computed at the last call coming from the same caller
* C1 and C2 are constants that can adjust the weight of STGL and LTGL in calculating the whole gray level.
* T is the threshold value that judges if the coming call is a spam call or not.

---

Once the STGL and LTGL values have been calculated they are summed. If the summation is less than the spam threshold value T, then the call is connected. If the summation is greater than T then the call is blocked rather than connected. Furthermore, if the sum of the prevSTGL and prevLTGL was less than T, then the current summation is indicative of a new occurrence of identifying the caller as a spam source so the caller's spamHistory is incremented. All of the new data is then inserted into the database.

These operations are shown as 503, but they could be separated into individual or differently grouped operations without affecting the scope of the invention.

Figure 6:
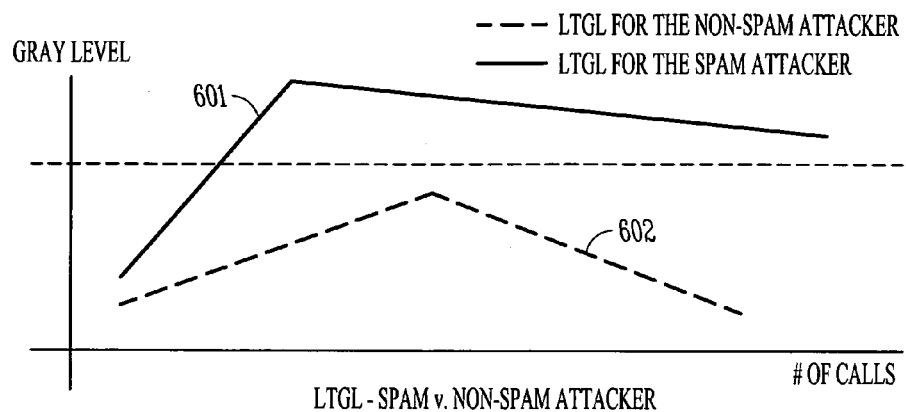
FIG. 6 is a plot of how one of the parameters of an embodiment of the invention can vary depending on the source of messages.

There are a few of things about the exemplary computation algorithm that should be noted. First, LTGL is calculated differently depending on the sign of the value of the expression, time-lap2−timeGap. When it is positive, LTGL is increased as a multiple of the previous spam history. That is, if a caller has committed a spam attack twice, LTGL is supposed to increase three times as fast as one who does not have a spam history. If LTGL is negative, it is decreased more slowly for the caller already identified as a spam attacker than for the normal caller. The aspects of how LTGL is treated are illustrated in FIG. 6 where the LTGL for the spam attacker, line 601 increases more quickly and decreases more slowly that the LTGL for the non-spam attacker, line 602.

A second thing to note about the exemplary algorithm— STGL increases more quickly as the intervals of the incoming calls get shorter. This is because the denominator of the expression min(max(timeGap, 1), time-lap1) is a value ranging from 1 and time-lap2, and equivalent to the interval of the two consecutive calls. The reason to limit the range of the denominator of the expression within 1 and time-lap1 is to adjust the steepness of the increase. If there is no limitation and the denominator is given as timeGap alone, STGL can be any high number (e.g., 60,000 for the two calls at intervals of 0.001 sec when time-lap1 equals 60 sec) for only two calls.

Figure 7:
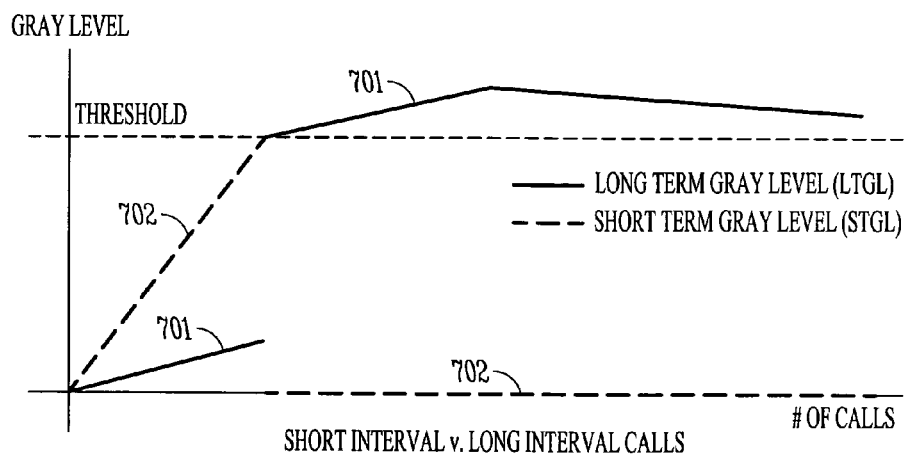
FIG. 7 is a plot of parameters associated with an embodiment of the invention.

A third thing to note about the exemplary algorithm is that once STGL passes the threshold, it is not increasing in the same way as it did below the threshold. Rather, STGL delivers its value to LTGL and resets itself to zero. After this moment, LTGL takes the responsibility of tracking the gray level and run its course, before STGL increases over the threshold once again. The idea behind this is that STGL is designed to protect the call server from spam calls very quickly. Once STGL does its job and denies the spam calls, LTGL takes the value of STGL and decrease it very slowly to deny the spam calls over a long period of time until it falls below the threshold. This aspect of the algorithm is reflected in the gray level plot of FIG. 7 with long term contributions shown as 701 and short term contributions shown as 702.

The main purpose of LTGL is two fold. First, to compensate the limitation of STGL and let the LTGL grow at a more rapid pace for the spammer than for the normal caller, resulting in calls from the spammer being blocked more quickly in the future. The second purpose of LTGL is to limit the number of calls for every user so that the algorithm is able to distinguish between marketing callers and normal callers. Since marketing callers tend to call on a regular basis, they can be another source of trouble by overflowing receivers' voice mail boxes.

Recalculating LTGL is necessary at every billing period since LTGL can increase continuously—even for non-spammers. If LTGL is not recalculated, non-spam calls will be blocked as well. If calls are made within the intervals of time-lap1 (i.e., one minute) and time-lap2 (i.e., a couple of hours), the LTGL will continue to increase. Once LTGL exceeds the threshold, calls will be blocked—even for normal users (who often make calls several times a day).

Thus FIG. 5 includes element 504 that addresses the operation of recalculating LTGLs in every billing period and updating the database as appropriate. More specifically, in this example the calculated LTGL is compared to the LTGL saved at the previous billing period. If the new LTGL is bigger than that previous LTGL and the spamHistory is not incremented in the current billing period then set the LTGL to the previous billing LTGL value. Otherwise leave the LTGL to be the value just calculated. Once that decision is made the LTGL for that caller is updated in the database. This is done for all of the callers.

Figure 8:
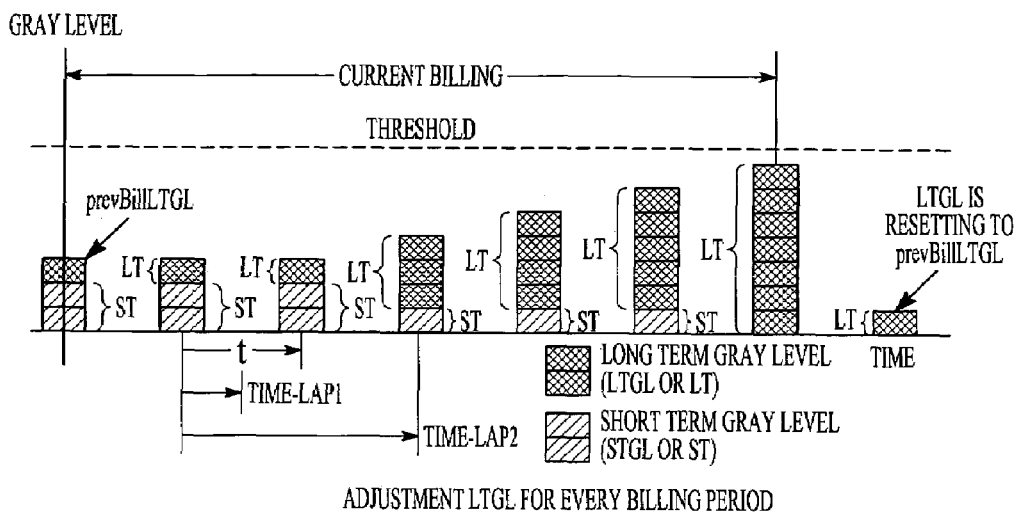
FIG. 8 is a plot reflective of another aspect of the invention.

This is due because LTGL has the ability to increase faster for marketing callers in order to catch up with the gray level that exceeds their given threshold. Consequently, unless the LTGL is reset at certain intervals, it will continue to grow, resulting in every caller exceeding the threshold. To prevent this undesirable event, at every billing point the algorithm sets the LTGL to the lower value of the previous LTGL and current LTGL—but only if the caller does not generate any spam activity. Note that the LTGL can decrease if the caller generates calls in a longer interval than time-lap2. Thus, it is not necessary to consider the previous LTGL every time. FIG. 8 is a plot of the gray level over time using LT and ST contributions and performing this "billing" period update operation.

The exemplary algorithm is also based on a crediting system. Even if a caller has tried spam voice attacks previously, they are allowed to make calls again if spam attacks have not been attempted for a long period of time. However, if they try spam attacks again, their calls are blocked much more quickly than before since their gray level values are higher than they were the first time around. In addition, the LTGL will be increasing much faster.

Information Regarding Exemplary Implementations

The exemplary algorithm has been implemented in two environments: one through a Cisco CallManager and the other a Vovida Open Communication Application Library (VOCAL) server using Session Initiation Protocol (SIP) (see Practical VoIP using VOCAL by Dang et al., 2002). The Cisco CallManager was set up with Java Telephone Application Program Interface (JTAPI) (see the Java Telephony API Specification 1.4, Sun Microsystems, whereas VOCAL used Back-to-Back User Agent (B2BUA) since JTAPI is no longer supported in VOCAL's current version.

Figure 9:
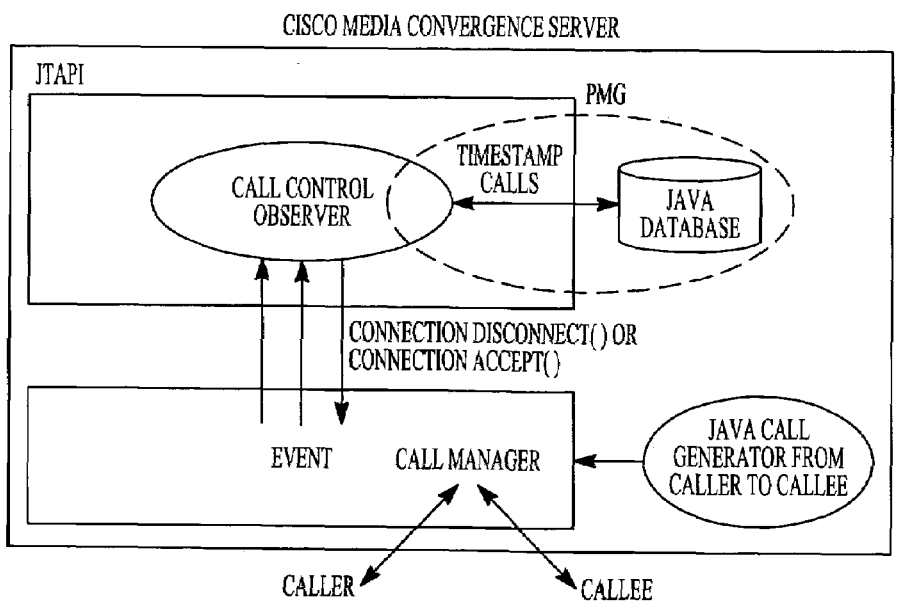
FIG. 9 a schematic diagram of a first environment in which an embodiment of the invention was tested.

FIG. 9 illustrates the arrangement of the algorithm set up to run as a part of JTAPI, parallel with the Cisco CallManager. It interacted with the CallManager and accepted special events that the CallManager 910 threw out after receiving input regarding the Java call generator from caller to callee 920. So in the events, 'CallCtlConnOfferedEv' and 'ConnAlertingEV', would be time stamped, the gray levels calculated and then recorded into a database based on the interactions of the call control observer 930 and the Java database 940. If the summation of STGL and LTGL exceeded the given threshold, the algorithm would simply inform the CallManager to disconnect the call and block it. Otherwise, the algorithm told the CallManager to let the call through.

Figure 10:
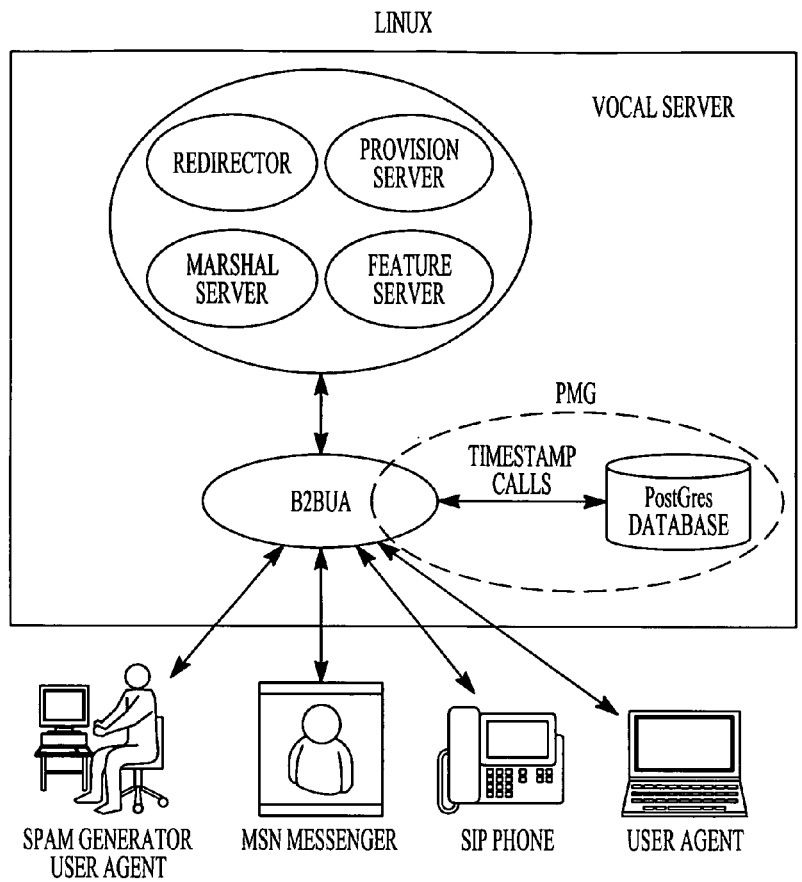
FIG. 10 is a schematic diagram of a second environment in which an embodiment of the invention was tested
Figure 11:
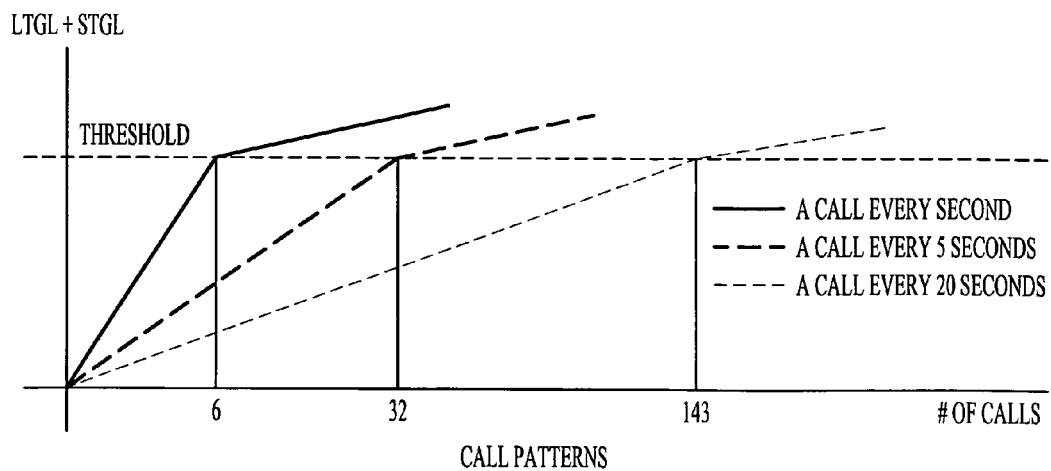
FIG. 11 is a plot illustrative of results depending on variations of one of the parameters of a test of the invention.

The implementation of the algorithm with VOCAL is illustrated in FIG. 10. It ran as a part of B2BUA 1010 where it time-stamped incoming calls to the PostGres database 1020. Whenever a caller made a call to a VOCAL server sending an INVITE message such as from spam generation user agent 1050, the algorithm in B2BUA caught it and analyzed the call pattern. If the gray levels were lower than the threshold, the algorithm passed the INVITE message to the vocal server and let the call through. Otherwise, it simply denied the authentication and returned a 404 message (User not found). Since a B2BUA and VOCAL server authenticated an INVITE message before going further, it could deny the spam call in the first check point and, thus, minimize the load given to the server.

Several tests were performed with different settings. The results were not affected by the settings given that the algorithm does not depend on any implementation details.

In one arrangement time-lap1 was set to one minute, time-lap2 set to one hour, C1 set to three, C2 set to one, and T set to 1000. Calls were generated every second from the same source as the algorithm was assessed. Seeing as the call generation algorithm worked in a couple of threads, it generated each call in less than a second. Occasionally a call would fail simply because an IP phone was not ready to accept the call.

In this first investigation, the algorithm accepted the first six of the 200 incoming calls but since the summation of two levels was higher than the threshold of 1000, it rejected the calls following. (Note that as the STGL passed the threshold after the first six calls, it gave its value to LTGL and reset itself back to zero.) LTGL increased continuously over the threshold for the next 194 calls. A second trial was done a day later and then again after ten days. The algorithm worked well and never allowed any call from the spam source in those subsequent trials. The data from this test is reflected in Table 2.

TABLE 2

| | First Test Run (One Call/Second) | | | |
|---|---|---|---|---|
| Trial | # of connected | # of disconnected | STGL | LTGL |
| First trial | 6 | 194 | 0 | 1484 |
| Second trial—after 1 day | 0 | — | 0 | 1474 |
| Second trial—after 10 days | 0 | — | 0 | 1365 |

In a second test, the same parameters as in the first test were used with one exception: calls were generated every five seconds. This time, the number of connected calls turned out higher (32 calls in the first trial). The slight increase in the interval to five seconds slowed down the growth rate of the STGL and LTGL. This coincided with the design rationale of the algorithm in that the algorithm is designed to respond and block incoming calls more quickly to more malicious attacks than others. The quicker calls come in, the more malicious they are considered since they may incur a denial of service or outage of the call server. Accordingly, the algorithm worked well in this case and did not connect calls even ten days after the first spam attack was implemented. This data is reflected in Table 3.

TABLE 3

| | Second Test Run (One Call/Five Seconds) | | | |
|---|---|---|---|---|
| Trial | # of connected | # of disconnected | STGL | LTGL |
| First trial | 32 | 168 | 0 | 1350 |
| Second trial—after 1 day | 0 | — | 0 | 1338 |
| Second trial—after 10 days | 0 | — | 0 | 1230 |

A third study was set up with the same parameter but with a much slower interval pace than the previous two tests. With incoming calls generated every 20 seconds, the number of connected calls grew to 143. It became apparent that the number of connected calls corresponds with the length of the interval between calls. Plots of the data for these three tests are illustrated in FIG. 10.

A separate test was carried out to see how the algorithm would work specifically with marketing calls, which are typically generated less frequently than spam calls but more frequently than normal calls. The call interval was set to 10 minutes and 150 calls total were generated. In order to respond to the marketing calls more efficiently, C2 was set to 10 causing LTGL to increase faster.

TABLE 4

PMG for Marketing Calls (One Call/10 Minutes)

| Trial | # of connected | # of disconnected | STGL | LTGL |
|---|---|---|---|---|
| First trial | 120 | 30 | 0 | 1201 |
| Second trial—after 1 day | 0 | — | 0 | 1188 |
| Second trial—after 10 days | 0 | — | 0 | 1083 |

The algorithm accepted the first 120 calls and blocked the next 30. It did not allow any call from the same source for the next 10 days which proved to be effective for the marketing call. Of course, the value assigned to C2 and T help determine the effectiveness. The smaller the number appointed to C2, the more marketing calls the algorithm is likely to accept for the first calls and following trials. When a high value is given to C2, the marketing call can be blocked more efficiently. However, at the same time, a higher C2 value creates a higher risk of blocking calls from a non-marketing caller (false positive problem that considers non-spam calls as spam. To reduce the risk of the false positive, it is recommended that the algorithm be regularly monitored by a supervisor.

The tests demonstrated that the algorithm works well in voice spam protection when parameters are set appropriately; it works well for unsolicited marketing calls under certain conditions. However, it is beneficial that a human expert monitor the algorithms for any false positives (legitimate calls considered spam by the algorithm) and adjust them accordingly.

CONCLUSION

While voice spam is not as well known to users as email spam, it must be taken as a serious threat to any VoIP environment. Marketers and spammers are already harassing users by sending unsolicited calls that not only consume time, but also precious bandwidth. While source IP names and addresses can be blacklisted, determined senders can easily use false information and thus, route around fixed address blocks. It is time to deploy a means to protect the VoIP environment from spam and stay one step ahead of the game.

A voice spam control algorithm uses Multi Gray-Leveling and can monitor the call patterns and determine voice spam based on those patterns. When a call is received, the algorithm splits the call patterns into two levels. If the summation of the two levels is less than a given threshold, the caller is considered a regular user and the call is connected. If the summation is greater than the given threshold, the caller is regarded as a spam generator and is blocked. Once a given threshold the algorithm within a specified interval is reached, the caller can no longer place any calls. The algorithm, however, gives callers a chance to atone for their undesired behavior. If a blocked caller stops producing voice spam in a specified period of time, their block will eventually be removed. Although, if they try spam attacks again, the algorithm can block them at a quicker rate than before since they have a spam history.

It is no doubt that call servers within a VoIP environment are facing the risk of outages due to spam. Voice spam must be stopped before it spins out of control. It is helpful to authenticate all incoming calls in order to wean out spam and marketers. The present invention meets that need. The algorithm can help take the destructive impact out of spam.

The references listed in the endnotes are incorporated by reference in their entirety to form a part of this disclosure.

The description in this application is exemplary; variations to the algorithm are possible. For example, in some applications, it may be appropriate to use STGL without LTGL. In other embodiments where both STGL and LTGL parameters are used, STGL values may be compared to a different threshold than LTGL values. Moreover, the methods described herein are not limited to the disclosed architectures.

While various embodiments of the invention have been described above, it should be understood that they have been presented by way of example only, and not limitation. Thus, the breadth and scope of the invention should not be limited by any of the above-described embodiments, but should be defined only in accordance with the following claims and their equivalents. While the invention has been particularly shown and described with reference to specific embodiments thereof, it will be understood that various changes in form and details may be made.

What is claimed is:

1. A method for reducing an impact of a source of unwanted voice messages in a call management system, the method comprising the use of one or more processors to perform at least a portion of one or more of the following operations:
   receiving a call request at a call server;
   determining a source of said call request;
   determining a time interval between the received call request and a previous call request from the source, information about said previous call request being retrieved from a database by a call manager;
   calculating a first parameter corresponding to a first time interval using the detected time interval;
   calculating a second parameter corresponding to a second time interval using the detected time interval, wherein the first and second time intervals overlap and wherein said second time interval is greater than said first time interval, at least part of the calculating being performed by at least one processor associated with the call manager; and
   using said first and second parameters to determine automatically if the received call is from a source of unwanted messages; and
   blocking connection by the call server of the call if the received call is determined to be from a source of unwanted messages.

2. The method of claim 1 wherein said the determining if the received call is from a source of unwanted messages includes:
   summing said first and second parameters, and
   comparing the sum of said first and second parameters to a threshold, wherein said threshold is indicative that a source's messages are unwanted.

3. A method for reducing the impact of voice spam in a call management system, comprising:
   receiving a call request at a call server from a first caller;
   retrieving from a database prior call data regarding said first caller;
   time stamping said call request;
   calculating a first parameter corresponding to a first time interval using said retrieved prior call data and said time stamp;
   calculating a second parameter corresponding to a second time interval using said retrieved prior call data and said time stamp;
   calculating a third parameter using said first and second parameters, at least part of the calculating being performed by at least one processor forming part of the call management system;

comparing said third parameter to a spam threshold whereby the comparison determines automatically whether the caller is deemed to be a source of voice spam; and if the caller is deemed to be a source of voice spam denying the call request.

4. The method of claim 3 further comprising:

generating updated prior call data using said first and second parameter; and replacing said retrieved prior call data with said updated prior call data.

5. The method of claim 3 wherein said first time interval is less than said second time interval.

6. The method of claim 5 wherein said calculating said third parameter includes summing said first and second parameters.

7. The method of claim 6 wherein the comparing includes comparing the third parameter to a spam threshold wherein the caller is deemed to be a source of spam when the sum meets or exceeds the spam threshold.

8. The method of claim 3 wherein said retrieved prior call data includes spam history data indicative of whether the caller has previously been deemed to be a source of voice spam.

9. The method of claim 8 wherein the calculating of said second parameter uses the retrieved spam history data.

10. The method of claim 9 wherein said second interval is longer than said first interval.

11. An apparatus for reducing an impact of a plurality of voice calls generated by a source, comprising:

a call manager;

a central processor;

a database; and a control program, executed by the central processor to interact with the call manager and database to perform the following processes:

identifying a caller as a source associated with a received call request;

time stamping the received call request;

retrieving prior call data regarding the identified caller from the database;

calculating a first parameter for a first time interval suing the retrieved prior call data and the time stamp;

calculating a second parameter for a second time interval using the retrieved prior call data and the time stamp;

using said first and second parameters to determine whether the identified caller is deemed to be a source of unwanted calls; and updating the database to reflect the calculated first and second parameters and any determination that the caller is a source of unwanted calls.

12. The apparatus of claim 11 wherein the control program provides status information to said call manager to effect a blocking of a call from a caller determined to be a source of unwanted calls.

13. The apparatus of claim 11, wherein the control program is further arranged to:

generate updated prior call data using said first and second parameter; and provide information to the database to replace said retrieved prior call data with said updated prior call data.

14. The apparatus of claim 11, wherein determining whether the identified caller is a source of unwanted calls includes:

calculating a third parameter using said first and second parameters; and comparing said third parameter to a threshold, the threshold being indicative of whether or not the identified caller is a source of unwanted calls.

15. The apparatus of claim 14, wherein said first time interval is less than said second time interval.

16. The apparatus of claim 15, wherein said calculating said third parameter includes summing said first and second parameters.

17. The apparatus of claim 11, wherein said retrieved prior call data includes unwanted call history data indicative of whether the caller has previously been deemed to be a source of unwanted calls.

18. The apparatus of claim 17, wherein the calculating of said second parameter uses the retrieved unwanted call history data.

* * * * *

UNITED STATES PATENT AND TRADEMARK OFFICE
CERTIFICATE OF CORRECTION

PATENT NO.      : 7,577,239 B1                                    Page 1 of 1
APPLICATION NO. : 11/125323
DATED           : August 18, 2009
INVENTOR(S)     : Shim et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1088 days.

Signed and Sealed this

Seventh Day of September, 2010

David J. Kappos
*Director of the United States Patent and Trademark Office*